United States Patent [19]

De Frank

[11] Patent Number: 5,364,032

[45] Date of Patent: Nov. 15, 1994

[54] SELF-PROTECTING IRRIGATION HOSE AND METHOD

[75] Inventor: Michael P. De Frank, Temecula, Calif.

[73] Assignee: T-Systems International, Inc., San Diego, Calif.

[21] Appl. No.: 187,748

[22] Filed: Jan. 26, 1994

Related U.S. Application Data

[63] Continuation of Ser. No. 14,779, Feb. 8, 1993, Pat. No. 5,282,578.

[51] Int. Cl.$^5$ ............................................. A01G 25/02
[52] U.S. Cl. ........................................................ 239/542
[58] Field of Search .............................................. 239/542

[56] References Cited

U.S. PATENT DOCUMENTS

| | | | |
|---|---|---|---|
| 4,247,051 | 1/1981 | Allport | 239/542 X |
| 4,763,842 | 8/1985 | Dunn | 239/542 |
| 4,984,739 | 1/1991 | Allport | 239/542 X |
| 5,111,995 | 5/1992 | Dumitrascu et al. | 239/542 |
| 5,118,042 | 6/1992 | Delmer | 239/542 |
| 5,123,984 | 6/1992 | Allport et al. | 239/542 |

FOREIGN PATENT DOCUMENTS 278049  3/1983  European Pat. Off. .

Primary Examiner—Andres Kashnikow
Assistant Examiner—Kevin Weldon
Attorney, Agent, or Firm—Christie, Parker & Hale

[57] ABSTRACT

In a method for protecting an irrigation hose from attack by the elements, an elongated flat sheet of flexible water impervious plastic film is bent along its length to form an overlapping longitudinal seam between opposing longitudinal margins of the sheet. The longitudinal seam is sealed with first and second rib like adhesive beads extending longitudinally uninterrupted along the opposing margins of the sheet in spaced apart relationship to form a continuous chemical storage channel defined by the beads and the opposing margins and to form a water supply channel defined by the remainder of the sheet. The chemical storage channel is fluidically isolated from the water supply channel. The sheet is laid on or under the ground. The ends of the chemical storage channel are sealed so that the only means of egress therefrom is through the interstices of the material of the sheet and the beads. A hose protecting chemical is injected into the chemical storage channel. The irrigation hose is put into service by pressurizing the water supply channel. The hose protecting chemical defuses slowly through the interstices of the sheet material so as to protect the exterior surface of the hose from insects, root intrusion, and or other damaging environmental conditions.

14 Claims, 4 Drawing Sheets

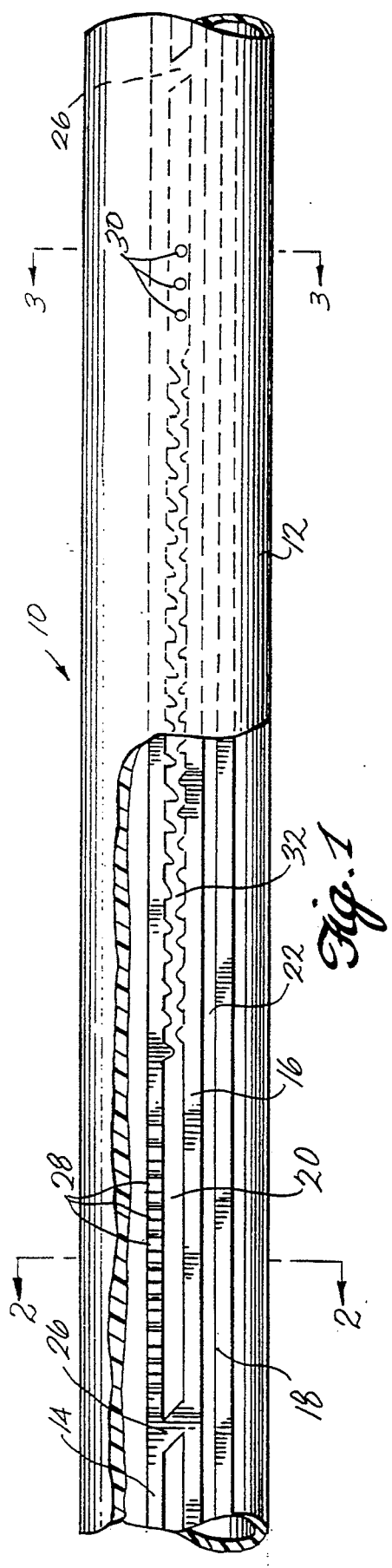
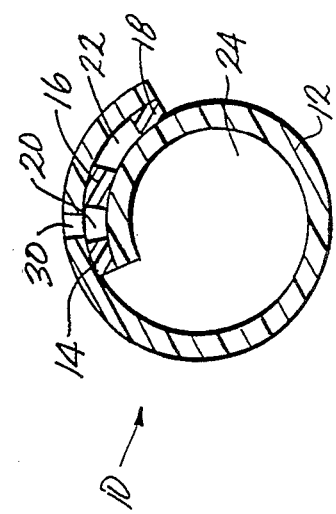
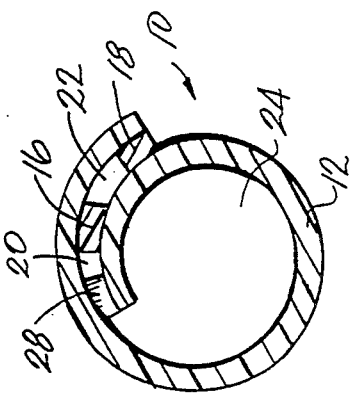

SELF-PROTECTING IRRIGATION HOSE AND METHOD

This is a continuation of application Ser. No. 08/014,779 filed Feb. 8, 1993 now U.S. Pat. No. 5,282,578.

BACKGROUND OF THE INVENTION

This invention relates to the field of drip irrigation and, more particularly, to a self-protecting irrigation hose and method.

Irrigation hose in agricultural use is subjected to harsh environmental conditions. Sun, insects, and roots of plants attack irrigation hose in situ. It is known to mix protective chemicals with the plastic material from which irrigation hose is made. For example, ultraviolet inhibitors, insecticides, and herbicides, such as Trifuralin, may be mixed with the plastic materials from which the irrigation hose is made. Alternatively, the chemicals are sometimes mixed in dilute quantities with the irrigation water distributed by the hose. U.S. Pat. No. 5,116,414, suggests encapsulation of liquid Trifuralin in a hollow plastic tube or cylinder having closed ends to prevent root growth under various circumstances.

SUMMARY OF THE INVENTION

One aspect of the invention is a method for protecting an irrigation hose from attack by the elements. An elongated flat sheet of flexible water impervious plastic film is bent along its length to form an overlapping longitudinal seam between opposing longitudinal margins of the sheet. The longitudinal seam is sealed with first and second rib like adhesive beads extending longitudinally uninterrupted along the opposing margins of the sheet in spaced apart relationship to form a continuous chemical storage channel defined by the beads and the opposing margins and to form a water supply channel defined by the remainder of the sheet. The chemical storage channel is fluidically isolated from the water supply channel. The sheet is laid on or under the ground. The ends of the chemical storage channel are sealed so that the only means of egress therefrom is through the interstices of the material of the sheet and the beads. A hose protecting chemical is injected into the chemical storage channel. The irrigation hose is put into service by pressurizing the water supply channel. The hose protecting chemical defuses slowly through the interstices of the sheet material so as to protect the exterior surface of the hose from insects, root intrusion, and or other damaging environmental conditions.

Preferably, the longitudinal seam is sealed with a third rib like adhesive bead extending longitudinally along the opposing margins of the sheet in spaced apart relationship from the first and second beads between the first and second beads and the water supply channel to form inboard of the chemical storage channel a flow regulating channel defined by the second and third beads and the opposing margins. A plurality of inlets are formed to the flow regulating channel from the water supply channel. A plurality of outlets are formed from the flow regulating channel to the exterior of the hose displaced from the respective inlets to provide a substantial path length for each inlet to a respective outlet.

Another aspect of the invention is a self-protecting irrigation hose made from an elongated flat sheet of plastic material and first, second, and third longitudinally extending, transverse ribs. The plastic film is bent along its length to form a lapped longitudinal seam between opposing longitudinal margins of the film. The ribs are arranged in spaced apart relationship to interconnect the opposing margins along their length. As a result, the overlapping longitudinal seam is sealed. The first rib lies inboard of the second rib, and the third rib lies outboard of the second rib to form a flow regulating channel defined by the first and second ribs, a chemical storage channel defined by the second and third ribs and a water supply channel defined at least in part by the remainder of the sheet. The first rib has a plurality of longitudinally spaced interruptions that form inlets to the flow regulating channel. The second and third ribs are longitudinally uninterrupted so that the chemical storage channel is isolated from the water supply channel and the flow regulating channel. A plurality of longitudinally spaced openings in the outboard margin of the film forms outlets from the flow regulating channel displaced from the respective inlets to provide a substantial path length from each inlet to a respective outlet. The described irrigation hose can be protected by sealing and filling the chemical storage channel with an appropriate hose protecting chemical.

BRIEF DESCRIPTION OF THE DRAWINGS

The features of specific embodiments of the best mode contemplated of carrying out the invention are illustrated in the drawings, in which:

FIG. 1 is a top, partially cut away view of a completed drip irrigation hose incorporating principles of the invention;

FIGS. 2 and 3 are side sectional views of the drip irrigation hose of FIG. 1 taken through planes 2—2 and 3—3, respectively;

FIG. 5 is a perspective view of the remote end of the drip irrigation hose of FIG. 1 in a course of installation.

DETAILED DESCRIPTION OF THE SPECIFIC EMBODIMENTS

Figure 4:
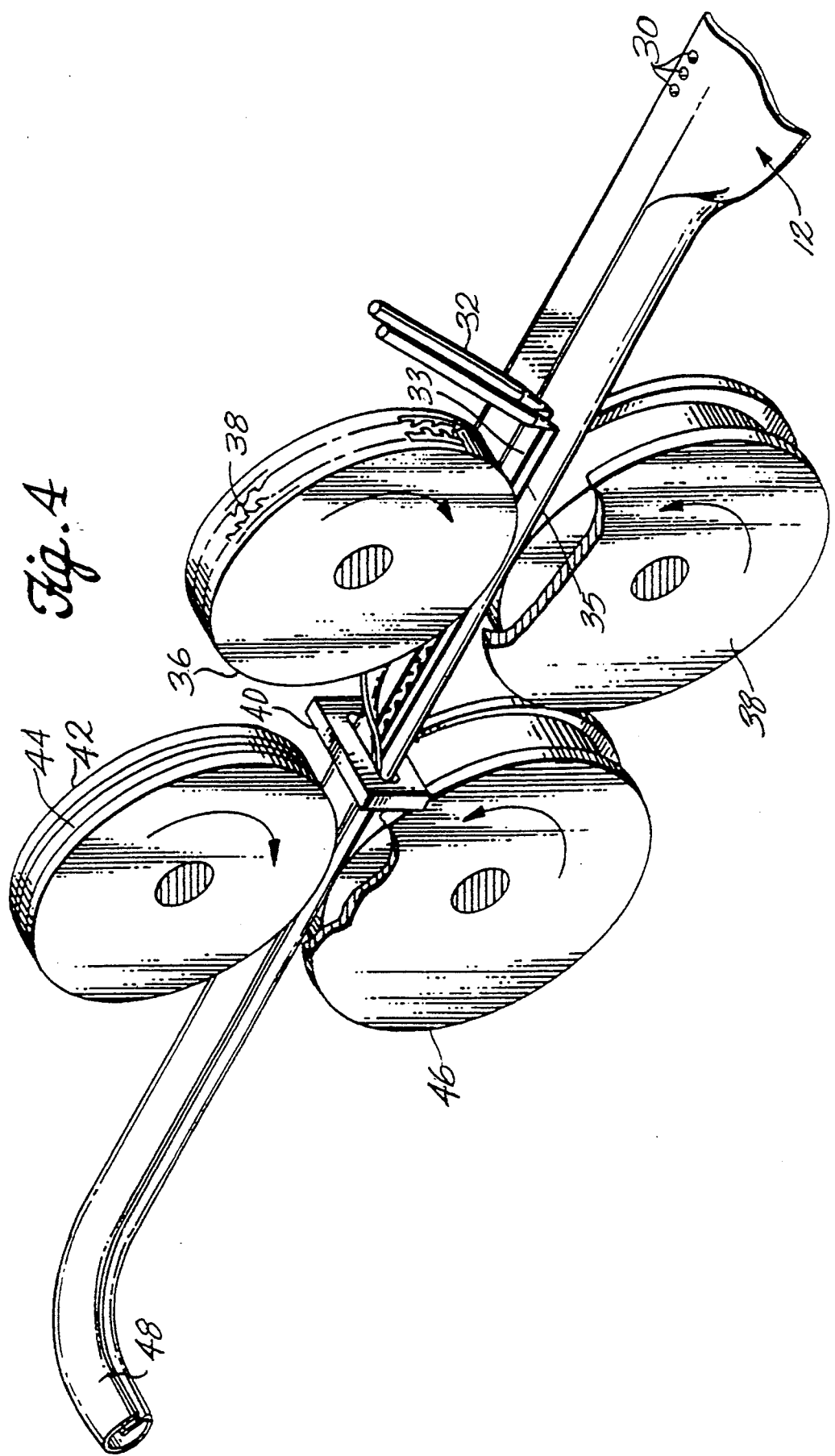
FIG. 4 is a schematic diagram of apparatus for manufacturing the drip irrigation hose of FIG. 1.

The disclosures of U.S. Pat. Nos. 4,247,051, 4,984,739, and 5,123,984, are incorporated fully herein by reference.

With reference to FIGS. 1, 2, and 3, a drip irrigation hose 10 is formed from a thin, e.g., 4 to 15 mil film 12 of flexible water impervious plastic material bent along its length to form an overlapping longitudinal seam between opposing longitudinal margins. The overlapping film margins are sealed by longitudinally extending, spaced apart ribs 14, 16, and 18, made of the same or compatible plastic material as film 12. Rib 14 is inboard of rib 16 and rib 18 is outboard of rib 16. Ribs 14 and 16 and the overlapping margins of film 12 define a flow regulating channel 20, as described in more detail in the referenced '051 and '739 patents. Ribs 16 and 18 and the overlapping margins of film 12 define a chemical storage channel 22 in accordance with the present invention. A water supply channel 24 is defined by the remainder of film 12.

At periodic intervals along the length of hose 10, cross ribs 26 extend between ribs 14 and 16 to define discrete segments within flow regulating channel 20, a plurality of interruptions are formed in rib 14 to define an inlet 28 to each segment of flow regulating channel 20 near one side of each cross rib 26, a plurality of outlet ports 30 are formed in the outer margin of film 12, near the other side of each cross rib 26, and a turbulent flow section 32 is formed in each segment between each inlet 28 and the corresponding outlet ports 30. Thus, as described in the referenced '051 and '739 patents, water under pressure in supply channel 24 flows through inlets 28, turbulent flow sections 32, and outlet ports 30, to the exterior of hose 10.

In accordance with the invention, rib 18, which is adjacent to and outboard of rib 16, extends along the entire length of hose 10 without interruption, i.e., there are no discrete inlets or outlets for fluid to pass into or escape from channel 22.

Figure 5:
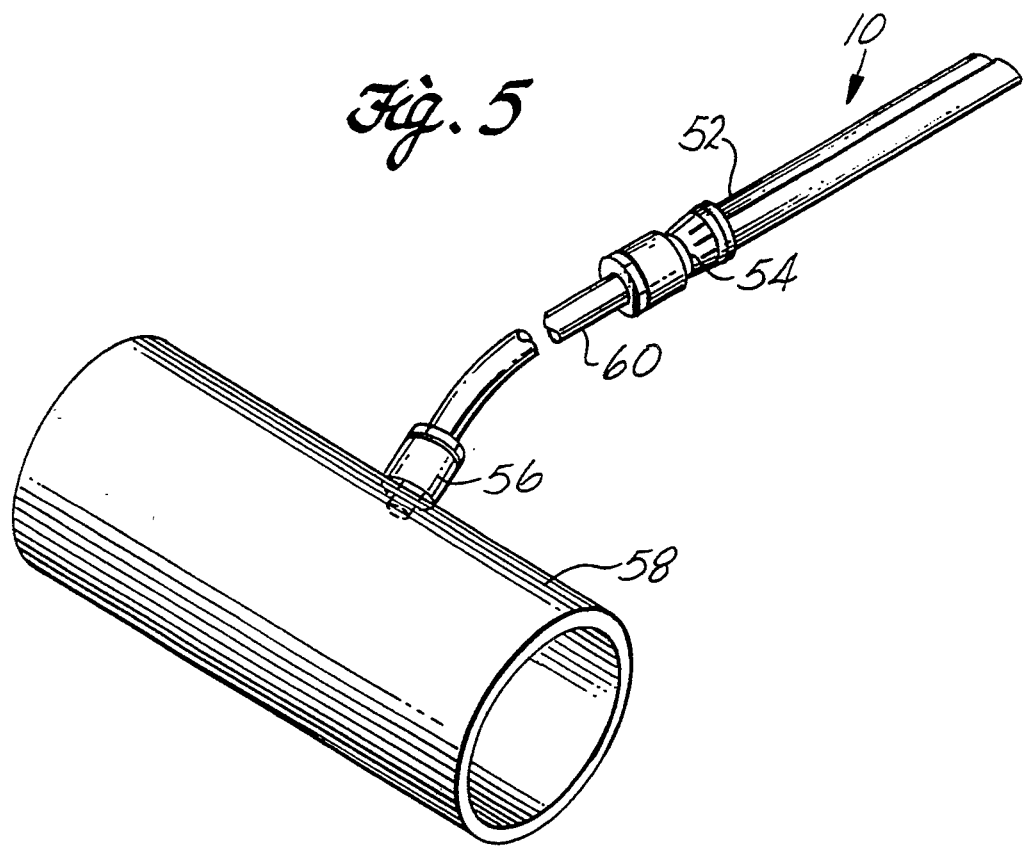
FIG. 5 is a perspective view of the source end of the drip irrigation hose of FIG. 1 after installation.

Reference is made to FIG. 5 for a description of the method for manufacturing the drip irrigation hose shown in FIGS. 1 to 3. Outlet ports 30 are formed along one edge of film 12 in the manner described in the referenced '984 patent. Thereafter, the other edge of the film is folded by a film guide, not shown, preparatory to passage under one or more extrusion nozzles 32. Preferably, there are two extrusion nozzles 32—one for laying down a bead 33 for ribs 14 and 16 and one for laying down a bead 35 for rib 18. In this way separate compositions can be used for ribs 14 and 16 and for rib 18. Film 10 then passes through the nip of a rotating molding wheel 38 and a backing wheel 38. Molding wheel 32 has a pattern of depressions 36 corresponding to the desired rib pattern on the hose as shown in FIG. 1. In the nip of wheels 32 and 34, beads 33 and 35 are shaped by molding wheel 32 to form repeatably on film 10 the desired rib pattern, after which the external overlapping margin of film 12 is folded by a guide 40 to overlap the internal overlapping margin of film 12. As a final step, the overlapped film 12 passes through the nip of a form wheel 42 and a backing wheel 46 to bond the margins to the pattern of beads created by molding wheel 32. Form wheel 42 has a groove 44 that depresses the pattern of beads created by molding wheel 32 to set the bead or rib height at a specified value that determines the flow rate of the hose.

Figure 6:
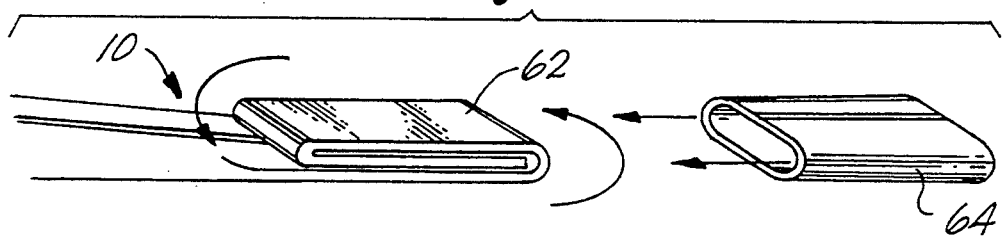
FIG. 6 discloses the method of sealing the water channel and chemical storage space by folding it over at its end.

After the described drip irrigation hose is manufactured, it is conventionally wrapped on a reel for storage and transportation. In use, the drip irrigation hose is unwound from the reel, laid in long runs on or under the ground in the region where irrigation is desired, and then cut off from the hose on the reel. As illustrated in FIG. 5, one end of the drip irrigation hose, i.e. a source end 52, is attached to a conventional connector 54 to seal that end of the chemical storage channel and the flow regulating channel. A conventional connector 56 is attached to a water supply manifold 58 to which irrigation water is supplied under pressure. Connector 54 is joined to connector 56 by hookup tubing 60. As illustrated in FIG. 6, at the other end of drip irrigation hose 10, i.e. a remote end 62, the hose is folded over twice, and a short section of the hose 64 is slid over the folded over end to secure and seal that end of the chemical storage channel and the flow regulating channel. By virtue of the seals at the ends of hose 10, the only means of egress for water from manifold 58 is through water supply channel 24, inlets 28, flow regulating channel 20, and outlet ports 30 to the soil in the vicinity of hose 10.

According to the invention, a hose protecting chemical, such as a herbicide or an insecticide, is injected into chemical storage channel 22, as for example, with a medical syringe, after which the puncture hole is sealed with plastic tape. By virtue of the seals at the ends of hose 10, the only means of egress for the hose protecting chemical is through the interstices of the material of film 12 and ribs 16 and 18. Since there are no discrete exit openings from channel 22, the release of the chemical from channel 22 is very slow, i.e., of the order of 10-15 micro liters per foot per day. While the irrigation hose is pressurized, the water pressure in water supply channel resists passage of the chemical through the inner overlapping margin, thereby favoring passage through the exterior overlapping margin to the area surrounding the irrigation hose.

In the usual case where the ribs are all made of a dense impervious plastic material, essentially all the chemical diffusion takes place through film 12. To increase the rate of release of the chemical, the bead from which rib 18 is formed could be from a foam material. As a result, rib 18 would be porous and would be conducive to a faster rate of delivery of chemical to the exterior of hose 10. The pore size and thus the rate of chemical release could be controlled by proper selection of the foaming material. Alternatively, rib 18 could be made from a hydrophobic plastic material such as polyethylene that would allow the vapors of the stored chemical to more readily penetrate the area surrounding the irrigation hose without directly applying the liquid chemical to the soil.

Figure 7:
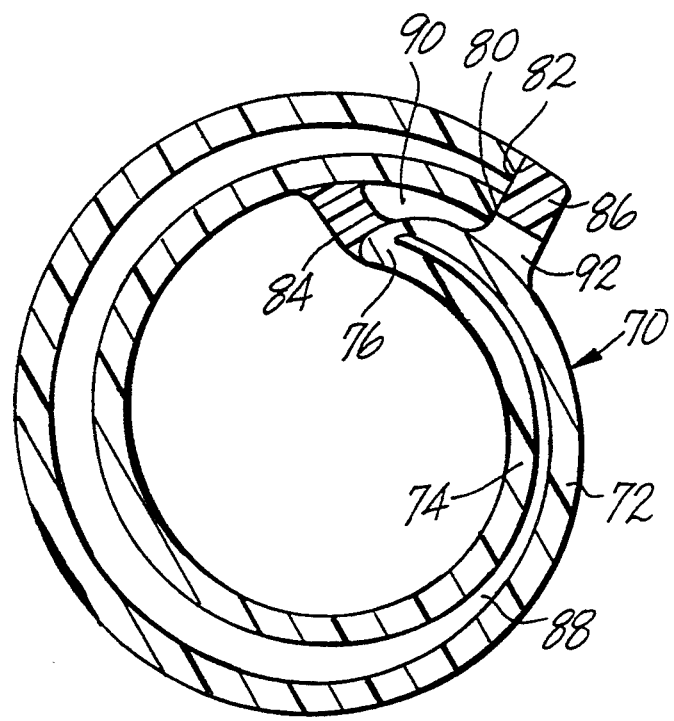
FIG. 7 is a side sectional view of an alternative embodiment of the invention.

Reference is made to FIG. 7 for an alternative embodiment of the invention. A length of water impervious plastic film 70 is folded lengthwise to form an outer layer 72, an inner layer 74, a longitudinal fold line 76, and longitudinal edges 80 and 82. A compatible plastic bead-like rib 84, which extends along the entire length of film 72, attaches and seals film 70 in the region of fold line 76 to the adjacent surface of the interior of layer 74 of film 70. A compatible plastic bead-like rib 86, which extends along the entire length of film 72, joins and seals edges 80 and 82 and the adjacent exterior surface of layer 72. The space between layers 72 and 74 serves as a chemical storage channel 88. The space defined by ribs 84 and 86 and the portions of layers 72 and 74 therebetween forms a flow regulating channel 90. In this embodiment, the inlets to flow regulating channel 90 are formed by interruptions in bead 84 (not shown) and the outlets from flow regulating channel 90 are formed by interruptions in bead 86, such as that represented at 92, in a fashion, for example, similar to the inlets and outlets in the referenced '739 patent.

The described embodiments of the invention is only considered to be preferred and illustrative of the inventive concept; the scope of the invention is not to be restricted to such embodiments. Various and numerous other arrangements may be devised by one skilled in the art without departing from the spirit and scope of this invention. For example, two or more chemical storage channels could be provided by forming more continuous longitudinal beads between the overlapping margins of the film. Or the invention, could be incorporated into an irrigation hose that does not have a flow regulating channel between the overlapping margins, such as a hose used with discrete insertable drip emitters.

What is claimed is:

1. A method for making an irrigation hose comprising the steps of:

bending an elongated flat sheet of flexible water imperious plastic material having longitudinal edges along its length to form an outer layer, an inner layer, and a longitudinal fold line and to place the longitudinal edges adjacent to each other;

sealing the sheet in the region of the fold line to an interior surface of the inner layer near, but spaced from, the longitudinal edges; and sealing the longitudinal edges of the sheet and an exterior surface of the outer layer near, but spaced from, the longitudinal fold line to form a relatively narrow flow regulating channel between the fold line and the interior surface of the inner layer and a relatively wide liquid storage channel between the outer and inner layers.

2. The method of claim 1, in which the step of sealing the sheet in the region of the fold line to the interior surface of the inner layer comprises sealing the sheet to the interior surface with a first rib like bead.

3. The method of claim 2, in which the first bead is interrupted to form inlets to the flow regulating channel.

4. The method of claim 3, in which the step of sealing the longitudinal edges of the sheet and the exterior surface of the outer layer comprises sealing the longitudinal edges and the exterior surface with a second rib like bead.

5. The method of claim 4, in which the second bead is interrupted to form outlets to the flow regulating channel.

6. The method of claim 5, additionally comprising after the steps recited in claim 1 the steps of:
laying the sheet on or under the ground;
sealing the ends of the liquid storage channel so the only means of egress therefrom is through the interstices of the material of the sheet and the beads;
injecting a hose protecting chemical into the liquid storage channel; and
pressurizing the water supply channel.

7. The method of claim 1, in which the step of sealing the longitudinal edges of the sheet and the exterior surface of the outer layer comprises sealing the longitudinal edges and the exterior surface with a rib like bead.

8. The method of claim 1, in which the second bead is interrupted to form outlets to the flow regulating channel.

9. The method of claim 1, additionally comprising after the steps recited in claim 1 the steps of:
laying the sheet on or under the ground;
sealing the ends of the liquid storage channel so the only means of egress therefrom is through the interstices of the material of the sheet and the beads;
injecting a hose protecting chemical into the liquid storage channel; and
pressurizing the water supply channel.

10. A self-protecting irrigation hose comprising:
an elongated flat sheet of plastic film having longitudinal edges bent along its length to form an outer layer, an inner layer, and a longitudinal fold line and to place the longitudinal edges adjacent to each other;
a first longitudinally extending transverse rib sealing the sheet in the region of the fold line to an interior surface of the inner layer near, but spaced from, the longitudinal edges; and
a second longitudinally extending transverse rib sealing the longitudinal edges of the sheet and an exterior surface of the outer layer near, but spaced from, the longitudinal fold line to form a relatively narrow flow regulating channel between the fold line and the interior surface of the inner layer, a relatively wide liquid storage channel between the outer and inner layers, and a water supply channel defined by the interior surface of the inner layer;
inlets to the flow regulating channel from the water supply channel; and
outlets from the flow regulating channel to the exterior of the hose.

11. The irrigation hose of claim 10, in which the liquid storage channel is isolated from the water supply channel and the flow regulating channel.

12. The irrigation hose of claim 10, in which the inlets are interruptions in the first rib.

13. The irrigation hose of claim 12, in which the outlets are interruptions in the second rib.

14. The irrigation hose of claim 10, in which the outlets are interruptions in the second rib.

* * * * *